United States Patent [19]

Katagiri et al.

[11] Patent Number: 5,450,960
[45] Date of Patent: Sep. 19, 1995

[54] CASSETTE CONTAINING CASE WITH AN INDEX CARD

[75] Inventors: Shingo Katagiri; Minoru Ishihara, both of Kanagawa, Japan

[73] Assignee: Fuji Photo Film Co., Ltd., Kanagawa, Japan

[21] Appl. No.: 123,467

[22] Filed: Sep. 20, 1993

Related U.S. Application Data

[63] Continuation of Ser. No. 708,645, May 31, 1993, abandoned, which is a continuation-in-part of Ser. No. 556,153, Jul. 23, 1990, abandoned.

[30] Foreign Application Priority Data

Sep. 1, 1989 [JP] Japan ........................ 1-101845 U
Sep. 13, 1989 [JP] Japan ........................ 1-106599 U

[51] Int. Cl.6 .................................... B65D 85/672
[52] U.S. Cl. ........................... 206/387.1; 206/232
[58] Field of Search ............ 206/387, 232, 312, 313, 206/444

[56] References Cited

U.S. PATENT DOCUMENTS

| | | |
|---|---|---|
| 3,638,788 | 2/1972 | Solomon . |
| 4,385,693 | 5/1983 | Gelardi et al. . |
| 4,627,534 | 12/1986 | Komiyama et al. ............... 206/309 |
| 4,648,507 | 3/1987 | Komiyama et al. . |
| 4,688,673 | 8/1987 | Yabe ..................... 206/387 |
| 4,828,105 | 5/1989 | Silengo et al. ............ 206/232 |

FOREIGN PATENT DOCUMENTS

| | | |
|---|---|---|
| 0440424A2 | 7/1991 | European Pat. Off. . |
| 1124585 | 5/1989 | Japan ..................... 206/387 |
| 559955 | 3/1975 | Switzerland . |
| 2079726 | 1/1982 | United Kingdom ............. 206/232 |
| 2100221 | 12/1982 | United Kingdom . |

Primary Examiner—Bryon P. Gehman
Assistant Examiner—Thomas P. Hilliard
Attorney, Agent, or Firm—Sughrue, Mion, Zinn, Macpeak & Seas

[57] ABSTRACT

A cassette container case including a casing having rotation-preventing projections formed thereon, a lid having a pocket portion for receiving a magnetic tape cassette pivotally connected to the casing in such a manner that the lid and the casing can be opened and closed like a door, recesses for receiving a thick portion of a magnetic tape cassette being formed in open sides of the lid and casing, and an index card attached to the index card covering the lid except for a region opposed to the recess which receives the thick portion of the cassette. In another embodiment, the index card includes a flap that covers the opening of the cassette through which the tape can be accessed.

4 Claims, 6 Drawing Sheets

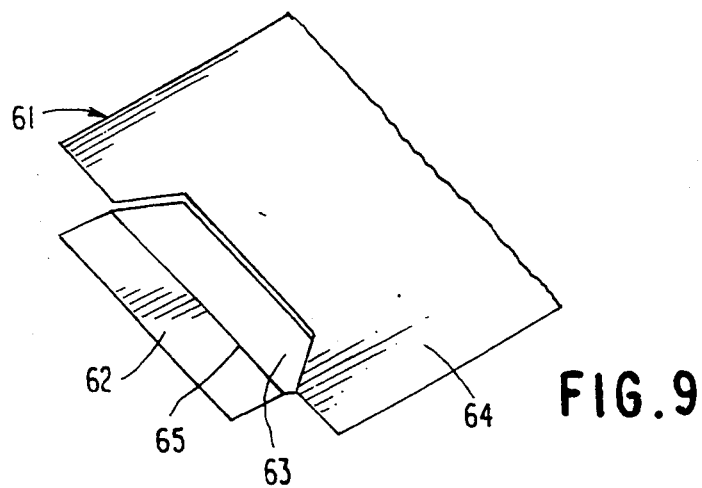
FIG.9
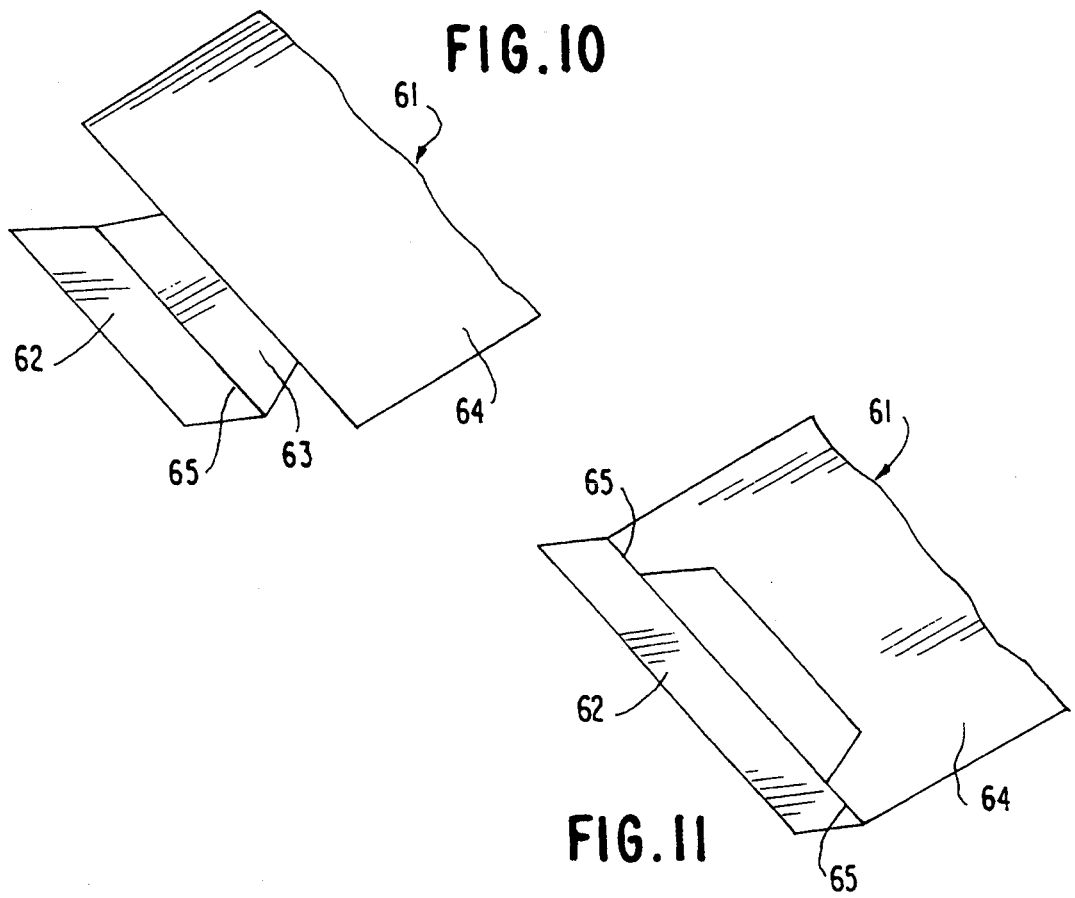
FIG.10
FIG.11

CASSETTE CONTAINING CASE WITH AN INDEX CARD

This is a Continuation of application No. 07/708,645, filed May 31, 1993, now abandoned which in turn is a continuation-in-part of application No. 07/556,153, filed on Jul. 23, 1990, now abandoned.

BACKGROUND OF THE INVENTION

The present invention relates generally to a cassette container case for storing a magnetic tape cassette, and more particularly to an improved cassette container case for storing a magnetic tape cassette for audio use or the like.

When storing an audio type magnetic tape cassette, the cassette is generally placed in a magnetic tape cassette container case made of a plastic material. The magnetic tape cassette has a front open portion into which a magnetic head, etc., is inserted when loading the cassette into a recording/reproducing device, the magnetic tape running across the front open portion during recording and reproduction. However, without sole way of enclosing the cassette, dust is liable to enter the cassette through the front open portion, and there is a risk that the user's fingers, etc., may contact the magnetic tape. In order to prevent such difficulties and to protect the entire cassette, a cassette container case is commonly used.

FIG. 1 shows the basic construction of a conventional cassette container case. The cassette container case 31 has a lid 32 having a pocket portion 34 for receiving a cassette 20, and a casing 35 having a pair of rotation-preventing projections 7 which are adapted to be inserted into respective shaft insertion holes 22 of the cassette 20.

In the cassette container case 31, pivot pins formed on right and left side walls of the casing 35 are fitted in corresponding through-holes formed in the right and left side walls of the pocket portion 34. With this arrangement, the lid 32 and the casing 35 can be opened and closed much like a door. The thickness of the cassette container case 31 between its walls 33 and 36 opposed respectively to the front and rear faces of the cassette 20 corresponds to the thick portion 21 of a cassette 20 in the region of its front opening. Therefore, except for the thick portion 21, the thickness $l_1$ of the cassette container case 31 is considerably greater than the thickness $l_2$ of the cassette 20.

Thus, when the cassette 20 is placed in the cassette container case 31 for storage purposes, a considerably greater storage space is required than if the cassette 20 were stored without a case. For this reason, if the user wishes to store as many cassettes 20 as possible in a limited space, for example, in an automobile, the user often refrains from using cassette container cases 31. However, if the cassette 20 is stored without the use of a cassette container case 31, dust tends to enter the cassette as described above, which results in a problem in that the recording and reproducing characteristics of the magnetic tape are degraded.

In order to overcome the above problems, the Applicant of the present invention has earlier proposed thin-type cassette container cases. (See U.S. Pat. Nos. 4,648,507 and 4,627,534).

In such a thin-type cassette container case, recesses for receiving the thick portion of the cassette at the front portion of the cassette are formed in an openable distal portion of the cassette container case.

The improved cassette container case disclosed in U.S. Pat. No. 4,627,534 will now be described with reference to FIG. 2. The cassette container case 11 shown in FIG. 2 has a lid 12 having a pocket portion 14, and a casing 15 which is pivotally connected to the lid 12 as in the conventional cassette container case. A recess 18 for receiving the thick portion 21 of a cassette 20 is formed in a wall 13 of the lid 12 opposed to the face of the cassette. Another recess 18 for receiving the thick portion 21 of the cassette is also formed in a wall 16 of the casing 15 opposed to the face of the cassette. A pair of rotation-preventing projections 7, similar to those of the conventional cassette case, and which are insertable into reel shaft insertion holes 22, are also formed on the wall 16.

The two recesses 18 are provided in the inner surfaces of the case in opposed relation to each other. Each recess 18 is shaped to receive the thick portion 21, that is, each recess has a shape (for example, a trapezoidal shape) flaring outward away from the axis of rotation (opening and closing movement) of the lid 12 and the casing 15.

Although not shown in the drawings, protrusions are formed on right and left side walls 19 of the casing 15, and respective depressions are formed in right and left side walls of the pocket portion 14 opposed to the walls 19. The protrusions are engageable in the depressions when the lid of the cassette container case 11 is closed, thereby preventing the lid from being accidentally opened during the storage of the cassette.

When the lid of the cassette container case 11 is in the closed position, the spacing between the wall 13 and the wall 16 is only slightly greater than the thickness $l_2$ of the cassette 20 in areas other than the thick portion 21, and the spacing between the two recesses 18 is only slightly greater than the thickness $l_5$ of the thick portion 21.

Therefore, the improved cassette container case 11 shown in FIG. 2 has a much smaller thickness than the earlier cassette container case, the space required for storing it is much reduced, and the improved case is very handy for carrying.

An index card 41 as shown in FIG. 3 is attached to the cassette container case 31 shown in FIG. 1, and desired data can be written on the index card 41. More specifically, the index card is positioned in such a manner that a folded portion 42 of a channel-shaped cross-section is fitted in the pocket portion 34, with a flat portion 43 laid over the flat wall 33 of the lid 32.

However, when the index card 41 is applied to the improved cassette container case 11 shown in FIG. 2, a problem is encountered. That is, since the recesses 18 are provided at the open side of the thin-type cassette container case 11, when the index card 41 is provided on the lid 12, the recess 18 formed in the lid 12 is blocked by the index card, defeating the function of the recess 18. To overcome this drawback, the present inventor has disclosed an index card 51, as shown in FIG. 3, which avoids closing the recess 18.

The index card 51 of FIG. 3 has a folded portion 52 for fitting in the pocket portion 14 similar to that of the earlier index card, but a flat portion 53 is smaller in width than the above-mentioned flat portion 43. More specifically, there is established the relationship $L_b < L_a - L_c$, where $L_a$ represents the width of the flat portion 43, $L_b$ the width of the flat portion 53, and $L_c$ the depth (width) of the recess 18. With this arrangement, the recess 18 formed in the open side of the lid 12 is not closed by the index card, so that the thick portion 21 of the cassette can be received in this recess.

However, with this configuration of the index card 51, the lid 12 is exposed at opposite sides of the recess 18, and a step is formed between such exposed portion and the portion where the index card 51 is present. This produces instabilities such as rattling. Moreover, powder tends to be produced as a result of the frictional contact between the cassette 20 and the lid 12. This is not desirable from the viewpoints of quality control and appearance.

SUMMARY OF THE INVENTION

An object of the present invention is to overcome the above deficiencies, and more specifically an object of the invention is to provide a thin-type cassette container case which can stably hold a magnetic tape cassette despite the provision of recesses for receiving the thick portion of a cassette.

The above and other objects of the invention have been achieved by a cassette container case wherein a lid having a pocket portion for receiving a magnetic tape cassette is pivotally connected to a casing having rotation-preventing projections in such a manner that the lid and the casing can be opened and closed like a door, recesses for receiving a thick portion of the magnetic tape cassette are formed in open sides of the lid and casing, and an index card having no region opposed to said recess is attached to the lid.

According to another embodiment of the invention, the index card includes a flap for covering the opening of the cassette through which the tape can be accessed. Further, a trapezoidal portion is either embossed or cut-out from the index card in order to accommodate the thick portion of the cassette.

BRIEF DESCRIPTION OF THE DRAWINGS

FIG. 9 is a perspective view of the index card of FIG. 8;

FIG. 10 is a perspective view of an index card according to yet another embodiment of the invention; and FIG. 11 is a perspective view of an index card according to still a further embodiment of the invention.

DESCRIPTION OF THE PREFERRED EMBODIMENTS

Preferred embodiments of a cassette container case of the present invention will now be described with reference to the drawings.

Figure 1:
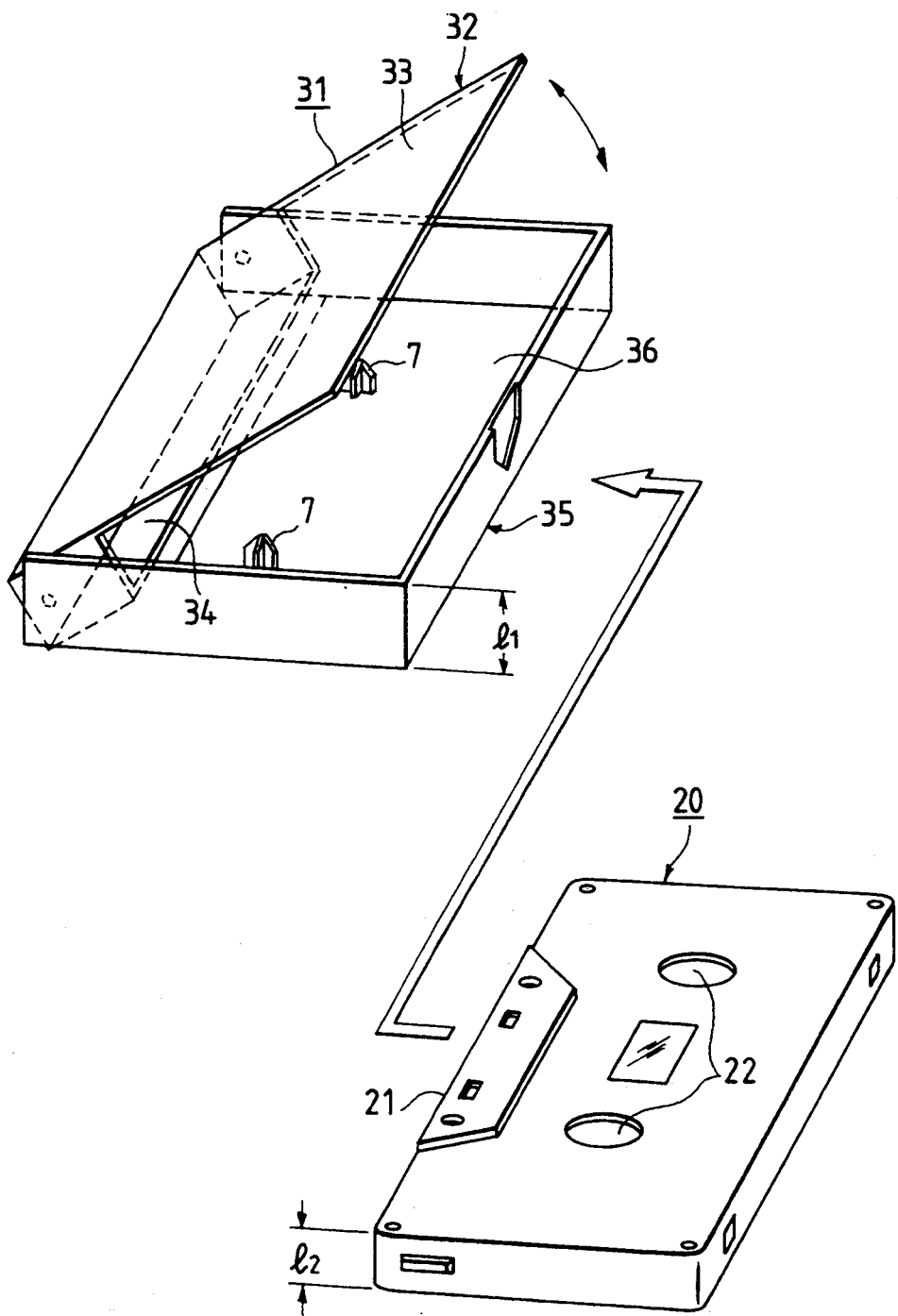
FIG. 1 is a perspective view of a conventional cassette container case.
Figure 2:
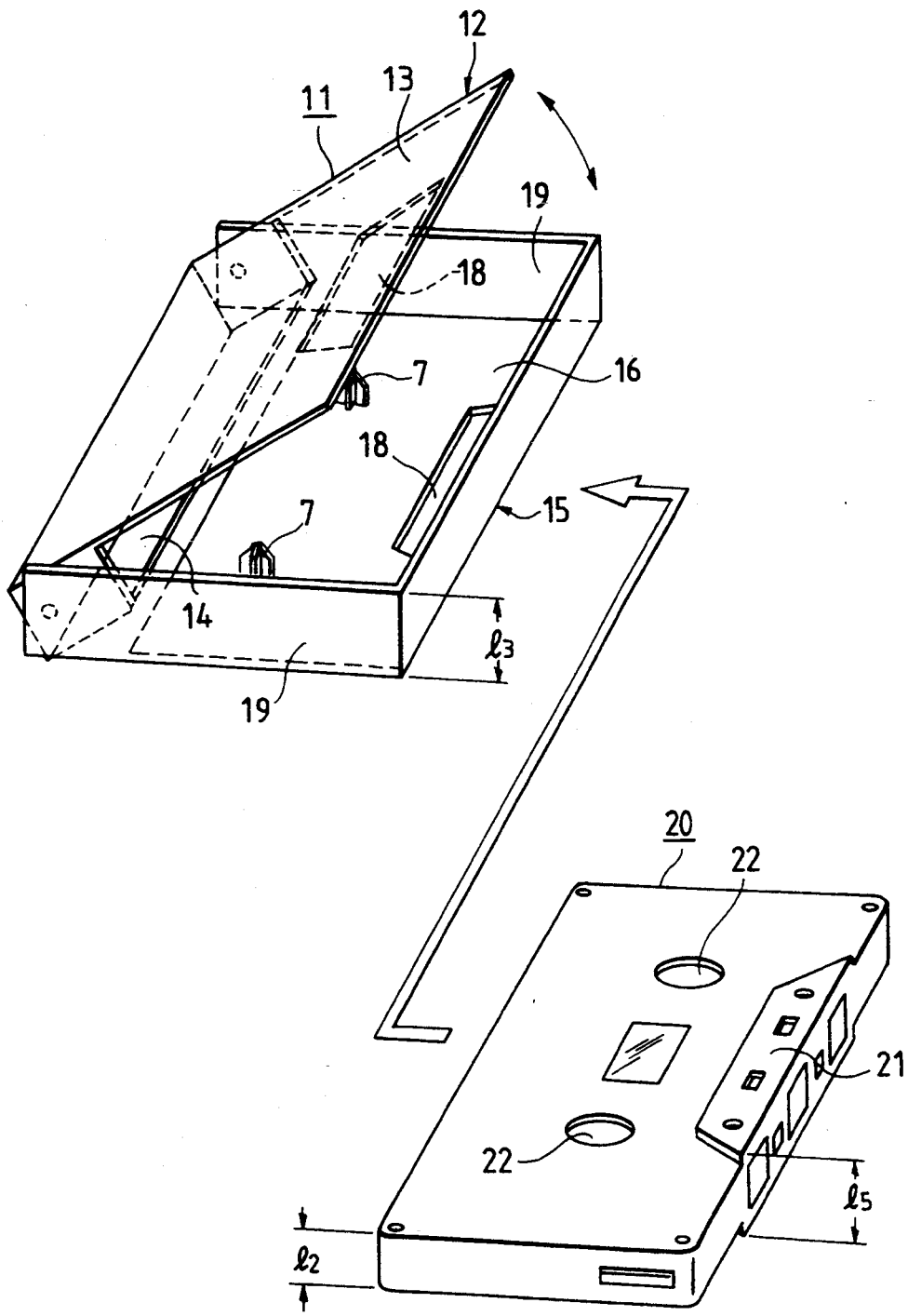
FIG. 2 is a perspective view of another conventional cassette container case.
Figure 3:
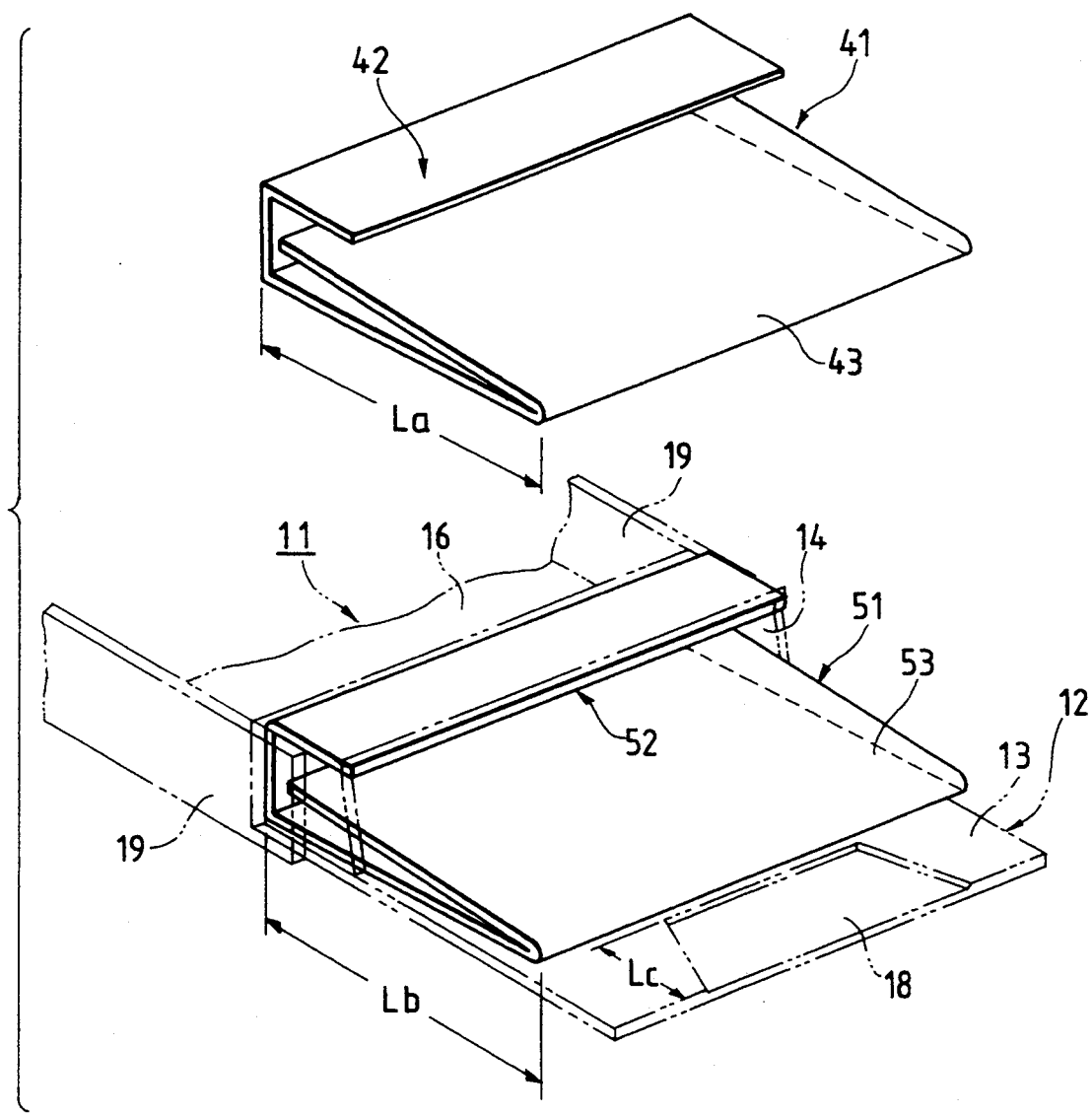
FIG. 3 is a perspective view, showing a conventional index card and an index card having a reduced width.
Figure 4:
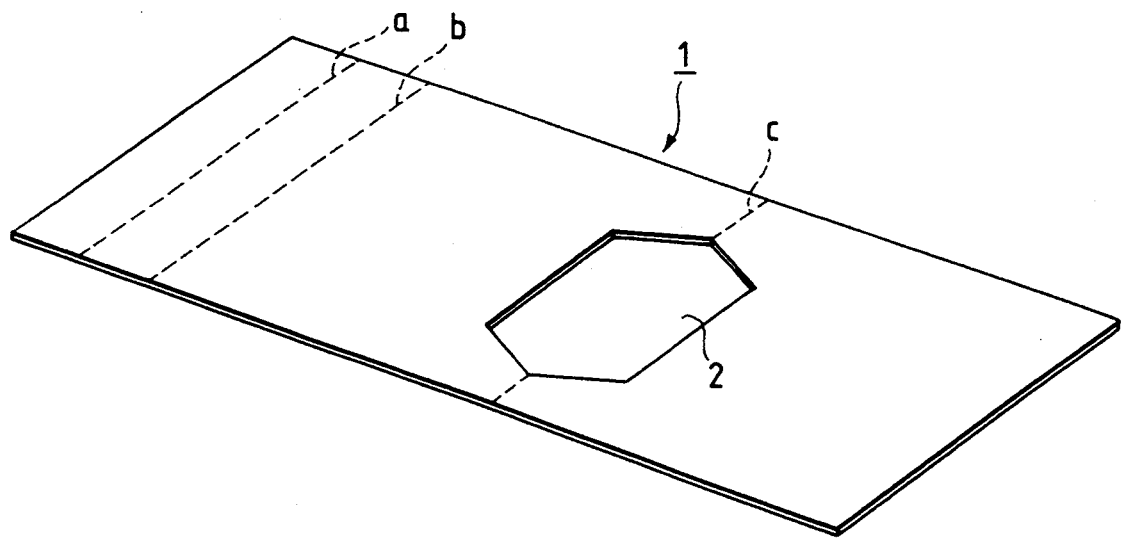
FIG. 4 is a developed, perspective view of an index card according to an embodiment of the present invention.
Figure 5:
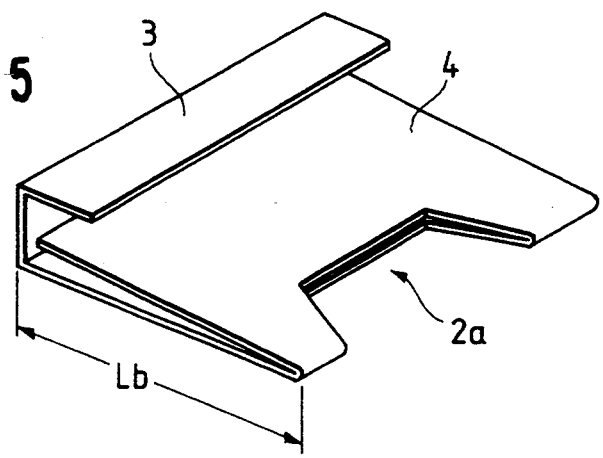
FIG. 5 is a perspective view of the index card.
Figure 6:
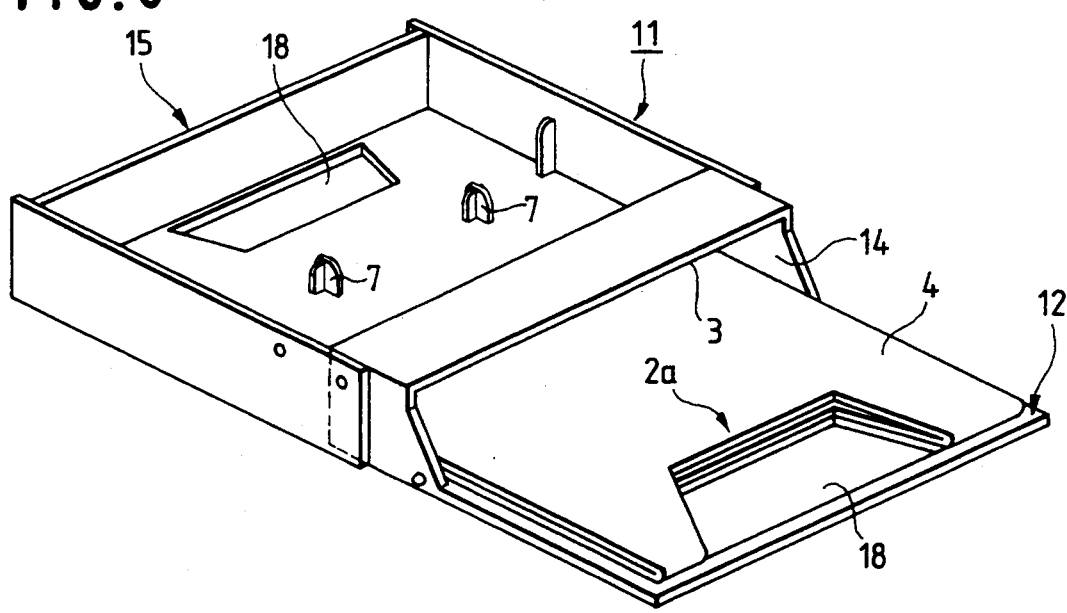
FIG. 6 is a perspective view of a cassette container case having the index card attached thereto.

FIG. 4 is a developed, perspective view of an index card for use in the cassette container case of a preferred embodiment of the invention. FIG. 5 is a perspective view of the index card. FIG. 6 is a perspective view of the case having the index card attached thereto. The index card in this embodiment is designed to be attached to the cassette container case 11 shown in FIG. 2, and therefore this embodiment will be explained with reference to this cassette container case 11.

As shown in FIG. 4, the index card 1 is formed from an elongated thick paper sheet cut from a paper blank, the thick paper sheet having an opening 2 of a hexagonal shape formed therethrough. The thick paper sheet is folded inwardly at portions thereof indicated by dashed lines a, b and c. The area of the opening 2 is twice that of the recess 18, and the shape of the opening 2 is determined in accordance with the shape of the recess 18. The position of the opening 2 is such that the opening 2 is disposed in registry with the recess 18 when the index card 1 is attached to the lid 12.

By folding the thick paper sheet along the dashed lines a and b, a pocket insertion portion 3 of a channel-shaped cross-section is formed as shown in FIG. 5. By folding the thick paper sheet along the dash line c, the hexagonal opening 2 is converted into an opening 2a whose area is half that of the hexagonal opening 2. The opening 2a corresponds to the recess 18. In the folded condition shown in FIG. 5, the width $L_b$ of a double flat portion 4 is substantially equal to the above-mentioned width $L_a$.

The cassette container case 11 having the index card 1 attached thereto will now be described.

As shown in FIG. 6, the pocket insertion portion 3 of the index card 1 is inserted into the pocket 14 portion of the lid 12. As a result, the double flat portion 4 is positioned so as to be laid over the wall 13 so that the recess 18 is exposed as part of the wall 13 through the opening 2a. Therefore, when the cassette 20 is inserted into the lid 12 as indicated by an arrow in FIG. 2, one side (the upper side in FIG. 2) of the thick portion 21 passes through the opening 2a and is received in the recess 18.

In this condition, when the casing 15 is closed, the recess 18 in the casing 15 is fitted on the lower side (FIG. 2) of the cassette thickened portion 21 already held in position, and at the same time the rotation-preventing projections 7 on the casing 15 are fitted in the respective shaft insertion holes 22 of the cassette 20, thereby completing the operation of placing the cassette 20 in the casing 15. Thus, the cassette 20 is positioned by the pocket portion 14 and the recess 18, and is resiliently held by the doubled index card 1. Therefore, rattling, etc., of the cassette 20 is less likely to occur.

Although a preferred embodiment of the invention has been described above, the invention itself is not to be restricted thereto, and various modifications can be made.

For example, the flat portion 4 of the index card 1 is not limited to the doubled form, and may be in a single form. In this case, the opening 2 is beforehand formed into a trapezoidal shape corresponding to the recess 18.

Also, the opening 2 may be slightly smaller in size than the recess 18 so that when the thick portion 21 passes through the opening 2, the edge portion of the opening 2 is turned or folded toward the recess 18. In this case, part of the index card 1 is interposed between the edge portion of the thick portion 21 and the edge portion of the recess 18, thereby further restraining rattling.

As described above, in the cassette container case according to the present invention, the lid having the pocket portion is pivotally connected to the casing having the rotation-preventing projections in such a manner that the lid and the casing can be opened and closed like a door, and the index card having the opening or the open area located so as not cover the recesses formed in the open sides of the lid and the casing is attached to the lid.

With the above construction of the cassette container case of the invention, the thick portion of the cassette passes through the opening or the open area of the index card and is received in the recess. Therefore, despite the fact that the index card is attached to the cassette container case, the cassette container case can be made thin as a whole.

Further, the index card also serves as a cushioning material so that rattling of the cassette is reduced, thereby decreasing the production of unpleasant noise and frictional contact between the cassette and the case.

Figure 7:
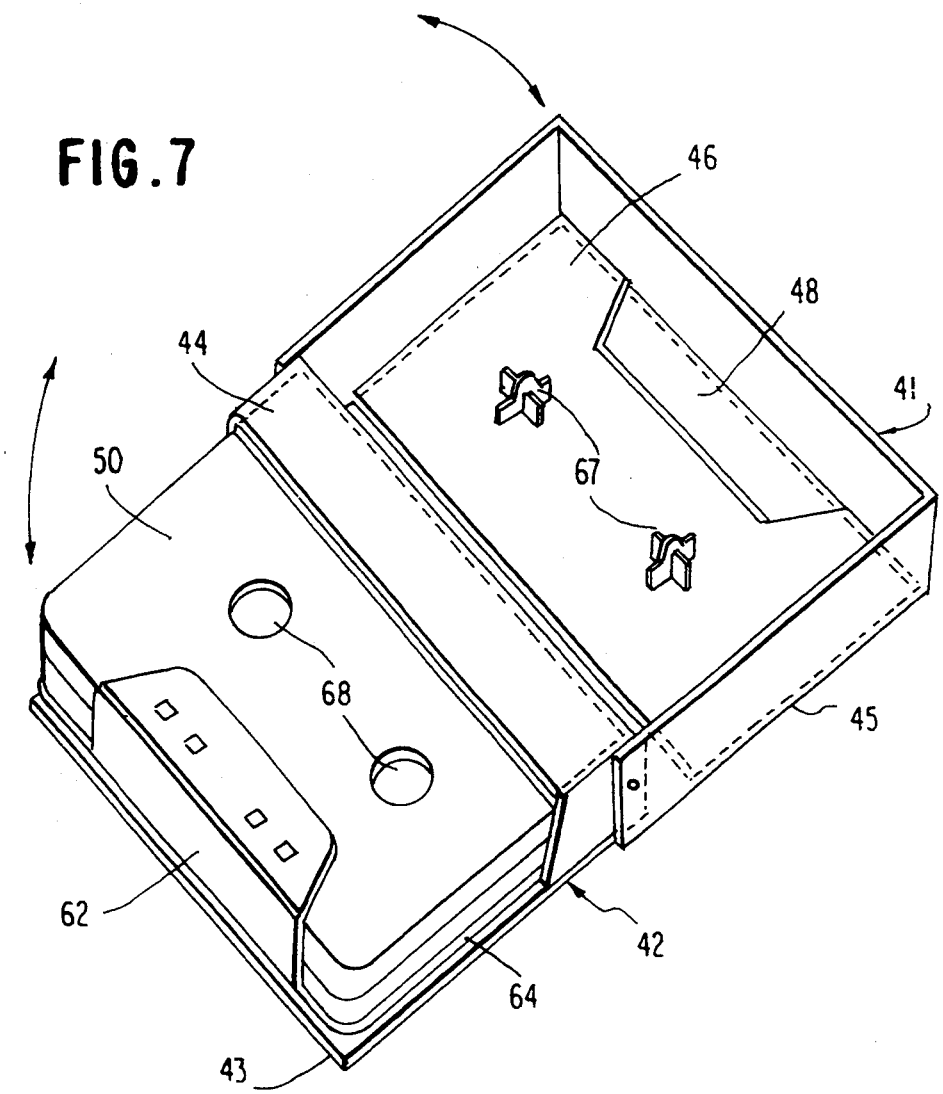
FIG. 7 is a perspective view showing a conventional cassette case having an index card according to another embodiment of the invention.
Figure 8:
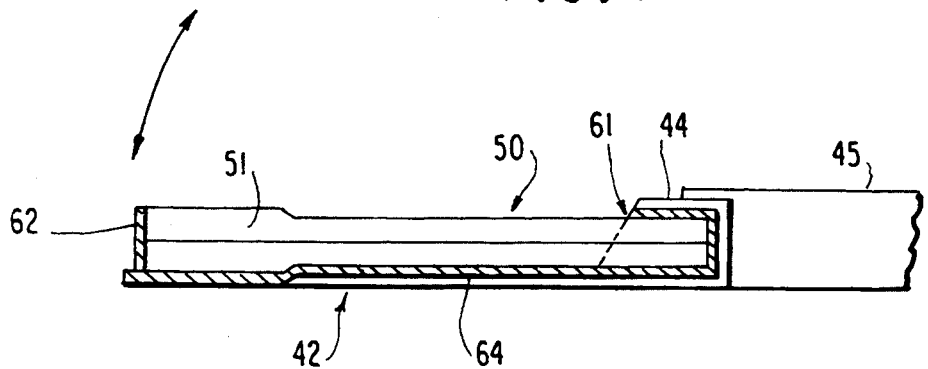
FIG. 8 is a side view of the FIG. 7 embodiment.

FIGS. 7-11 illustrate further embodiments of the present invention. FIG. 7 is a perspective view of a further embodiment showing a state in which a cassette is being accommodated in the cassette containing case according to the invention, and FIG. 8 is a side view thereof.

The basic structure of the cassette containing case 41 shown in FIGS. 7 and 8 is the same as the cassette containing case described in Japanese Utility Model Unexamined Publication No. 52782/1988. More specifically, the cassette containing case 41 shown in FIGS. 7 and 8 includes a cover 42 having a pocket 44 and a casing 45. Both the cover and the casing are pivotably attached to the case. On a wall portion 43 of the cover 42 which confronts one of the opposing surfaces of a cassette 50 is formed a recessed portion 48 for accommodating a thick portion 51 of the cassette 50, the thick portion 51 constituting the front opening of the cassette 50. Further, on a wall portion 46 of the casing 45 which confronts the other opposing surface of the cassette 50 are provided a recessed portion 48 for accommodating the thick portion 51 and a pair of reel stopper projections 67 into which reel shaft holes 52 are inserted.

Both recessed portions 48 are arranged inside the case so as to confront each other in the open position of the case. The shape of the recessed portions 48 is trapezoidal so that the thick portion 51 of the cassette can be received therein.

A feature of this embodiment is an index sheet 61 disposed along the wall of the cover 42. Specifically, the index sheet 61 extends along the walls of the pocket 44 and wall 43 of the cover 42 with a front flap 62 that stands upright widthwise at a position confronting the bent portion of the pocket 44 so as to allow the cassette front opening to be covered thereby.

As shown in FIG. 9, the index sheet 61 is such that a portion 63 that corresponds to the thick portion of the cassette in an extensive area 64 confronting the wall 43 is formed into an embossed trapezoid to accommodate the thick portions 51 of the cassette. The front flap 62 is arranged so as to extend rectangularly along the trapezoidal portion 63 with a folding line 65 as a border. The folding line 65 is bent substantially at right angle in an L-like configuration, thereby allowing the front flap 62 to cover the front opening of the cassette.

Accordingly, when the rear portion of the cassette 50 is inserted into the pocket 44 of the cover 42, the front flap 62 of the index sheet 61 can instantly be set to the front opening of the cassette. Since the front opening of the cassette is covered by the front flap 62, the magnetic tape of the cassette from being touched by the user. Further, to open the cassette containing case 41, the magnetic tape is not directly touched by a hand or fingers because the front opening of the cassette is covered by the front flap 62.

The index sheet 61 of the invention may preferably be made of a material free from dust such as paper or a plastic sheet. An index sheet provided with anti-static finish may also be used.

The application of the device is not limited to the above embodiment, but may be modified to those shown in, e.g., FIGS. 10 and 11. In the modification shown in FIG. 10, the front flap 62 for covering the front opening of the cassette is formed so that the trapezoidal portion 63 protrudes from the extensive portion 64. In this construction, a portion of the front flap 62 on opposite sides of the trapezoidal portion 63 is cutout.

In the modification shown in FIG. 11, the trapezoidal portion is cutout, and the front flap 62 is wide enough to cover the entire side length of the front opening.

The front flap 62 may be arranged by modifying the index sheet as described in the above examples, but may be embodied in other ways as well. A front flap 62 formed separately from the index sheet may be assembled or adhesively fixed to the index sheet, or may be adhesively attached to the cover 42.

As described in the foregoing, the cassette containing case according to the invention includes a cover, a casing, and a recessed portion for accommodating the thick portion of the cassette. The cover and the casing are pivotably fixed so as to be freely opened and closed. Additionally, a sheet capable of extending across the width of the case is provided in the cover to cover at least the front opening of the cassette.

As a result of this construction, not only can the thickness of the case be reduced, but also the front opening of the cassette can be covered by the sheet, thereby preventing the magnetic tape from being touched at the time of opening and closing the case. This obviates risks not only of impairment of sound quality such as dropout due to contamination, scratching, folding, or the like of the magnetic tape, but also of tape jamming and defective tape travel due to folding of the tape.

What is claimed is:

1. A cassette container case, comprising:
    a casing having an opening for receiving a cassette;
    a lid having a pocket portion for receiving a magnetic tape cassette said lid having a recess for receiving a thick portion of said magnetic tape cassette;
    means for pivoting said lid with respect to said casing; and
    an index card disposed in said pocket portion and being limited in extent to the inside surface of said lid, said index card having a cut-out portion conforming to said recess, wherein said index card is folded double, and wherein in an unfolded state of said index card, said opening is a hexagonally,-shaped hole of substantially twice the area of said recess.

2. The cassette container case of claim 1, wherein said casing comprises a pair of rotation-preventing projections formed thereon for preventing rotation of hubs of a cassette contained within said container case.

3. The cassette container case of claim 1, wherein another recess is formed in said casing opposing said recess in said lid.

4. A cassette container case, comprising:
   a casing having rotation preventing projections formed thereon;
   a lid having a pocket portion for receiving a magnetic tape cassette and being pivotally connected to said casing such that said lid can be pivoted with respect to said case to a closed position in which said cassette is disposed within said casing, said lid and said casing having opposing recesses when said lid is in said closed position for receiving a thick portion of said cassette; and
   an index card disposed in said pocket portion so as to cover at least a portion of an inside surface of said lid, said index card having an opening at a position adjacent said recess in said lid so as to accommodate said thick portion of said cassette, said index card being limited in extent to the inside surface of said lid and covering said lid except for a region opposed to said recess, wherein said index card is folded double, and wherein in an unfolded state of said index card, said opening is a hexagonally-shaped hole of substantially twice the area of said recess.

* * * * *